(No Model.) 3 Sheets—Sheet 1.
H. D. PERKY.
APPARATUS FOR PREPARING GRAIN FOR REDUCING MACHINES.
No. 548,087. Patented Oct. 15, 1895.
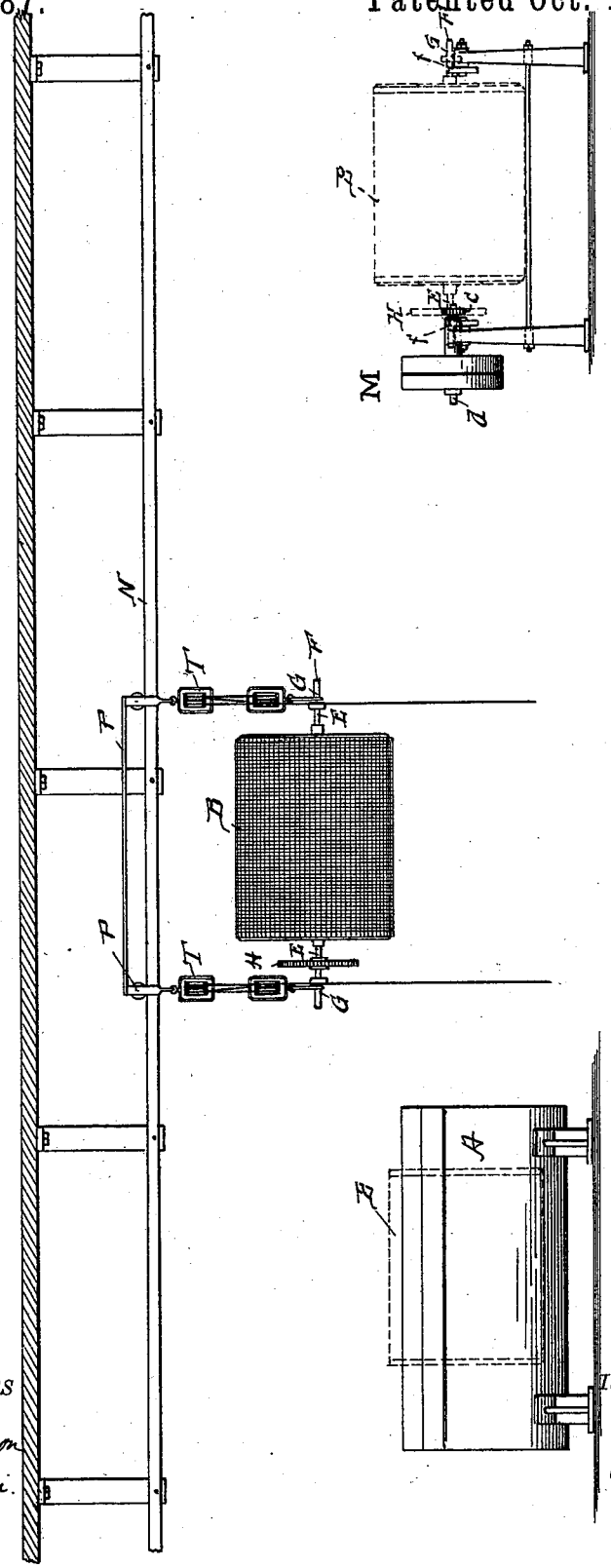
WITNESSES
INVENTOR
H. D. Perky
by E. W. Anderson
his Attorney (No Model.) 3 Sheets—Sheet 2.
H. D. PERKY.
APPARATUS FOR PREPARING GRAIN FOR REDUCING MACHINES.
No. 548,087. Patented Oct. 15, 1895.
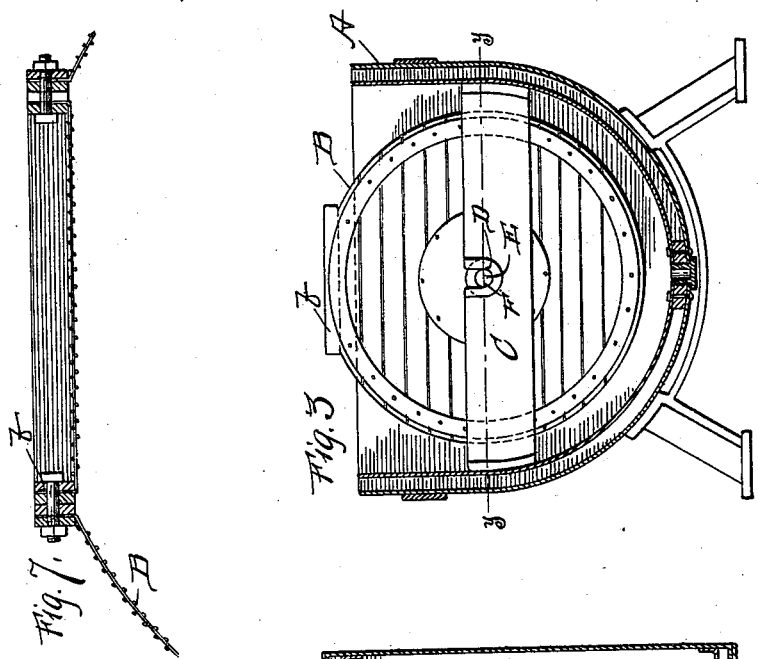
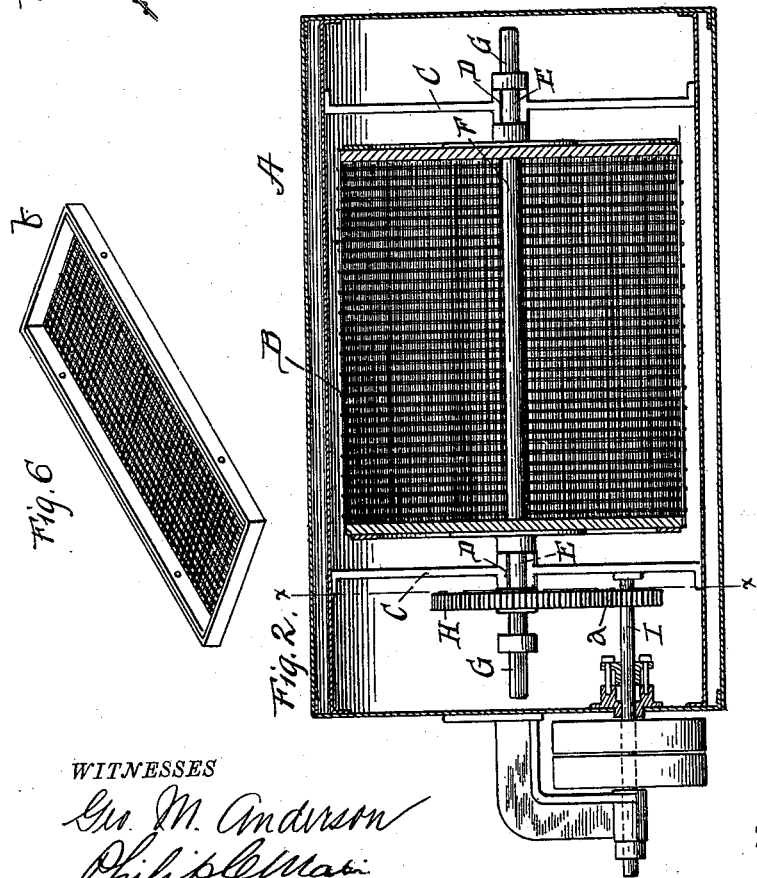
WITNESSES
Geo. M. Anderson
Philip C. Mat—
INVENTOR
H. D. Perky
by E. W. Anderson
his Attorney (No Model.) 3 Sheets—Sheet 3.
H. D. PERKY.
APPARATUS FOR PREPARING GRAIN FOR REDUCING MACHINES.
No. 548,087. Patented Oct. 15, 1895.
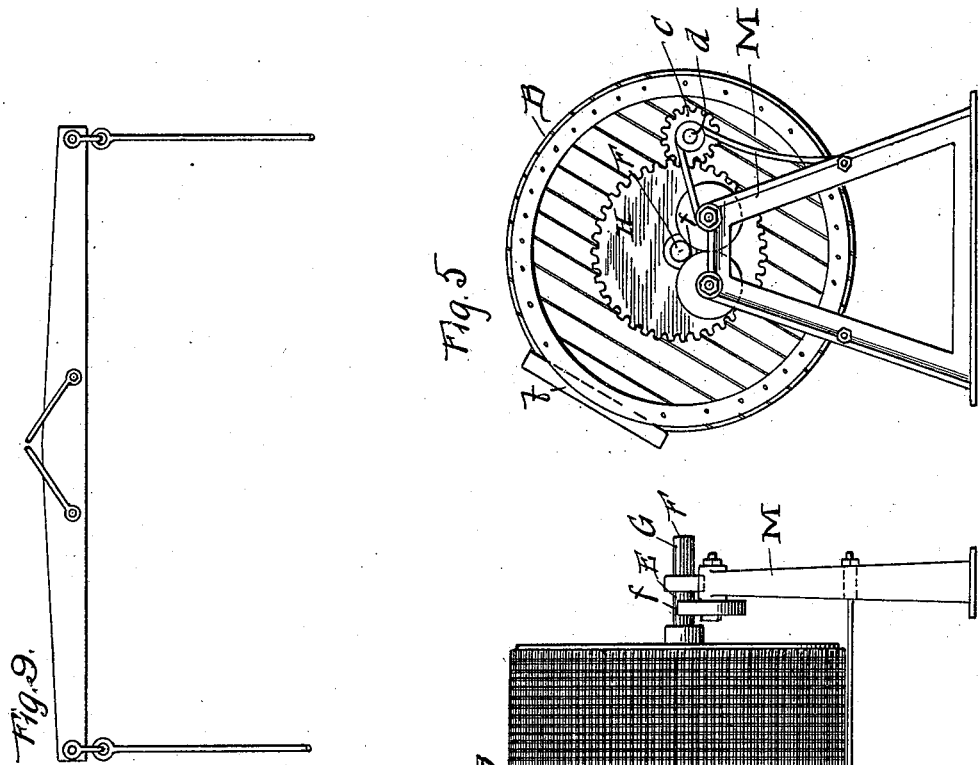
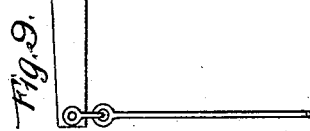
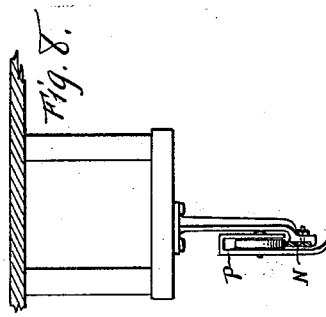
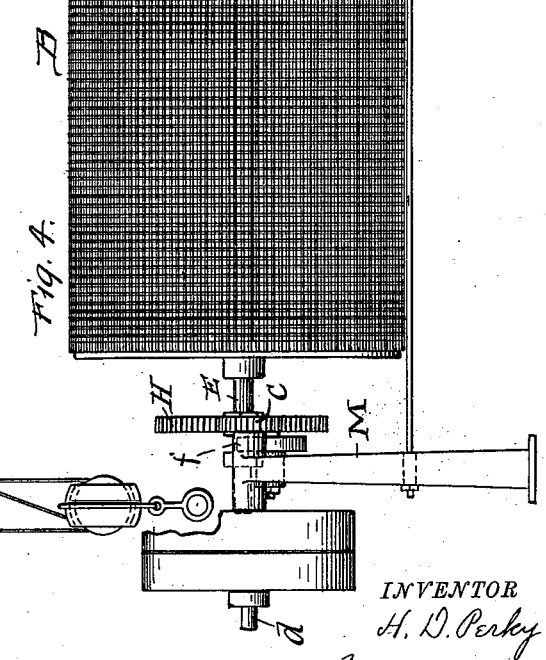
WITNESSES
Geo. M. Anderson
Philip C. Masi.
INVENTOR
H. D. Perky
by E. W. Anderson
his Attorney

UNITED STATES PATENT OFFICE.

HENRY D. PERKY, OF BOSTON, MASSACHUSETTS.

APPARATUS FOR PREPARING GRAIN FOR REDUCING-MACHINES.

SPECIFICATION forming part of Letters Patent No. 548,087, dated October 15, 1895.

Application filed May 4, 1894. Renewed May 31, 1895. Serial No. 551,185. (No model.)

*To all whom it may concern:*

Be it known that I, HENRY D. PERKY, a citizen of the United States, residing at Boston, in the county of Suffolk and State of Massachusetts, have invented new and useful Apparatus for Preparing Grain for Reducing-Machines; and I do declare the following to be a full, clear, and exact description of the invention, such as will enable others skilled in the art to which it appertains to make and use the same, reference being had to the accompanying drawings, forming part of this specification, and to letters of reference marked thereon.

Figure 1 of the drawings is a side elevation of the invention with the cage removed and on the carrier. Fig. 2 is a horizontal section on line $yy$, Fig. 3. Fig. 3 is a transverse vertical section on line $xx$, Fig. 2. Fig. 4 is a side elevation of drier with cage thereupon. Fig. 5 is an end view of same with band-wheels removed. Fig. 6 is a detail of the removable cover to cage. Fig. 7 is a transverse section of the opening and cover of cage. Fig. 8 is an end view of carrier, fall and tackle, and track-supports, the track being shown in section. Fig. 9 is a detail of crane used instead of track.

In the process of preparing wheat and other grain for reducing-machines in which the entire nutritive properties of the whole grain or berry are utilized it is designed to boil or cook the grain without destroying the form of the independent berries and then to dry the same until the interior of the berry becomes less soft and more nearly approaches its exterior in consistency.

The object of this invention is to provide convenient apparatus whereby the grain in large quantities can be expeditiously boiled and dried to proper condition for the action of such reducing-machines.

The apparatus comprises a boiler, suitable rotary wire-cloth or perforated holding cages or tumblers adapted to be placed in said boiler, rotating mechanism therefor, drying-frames also adapted to receive the holders or cages and rotate the same, and a traveling hoist and carrier to move the holders or cages from the boiler to the drying-frames.

In the accompanying drawings, the letter A designates a boiler, which is usually constructed with double walls and steam-chamber between said walls for the application of steam heat. Across the boiler, at an interval from each other a little greater than the length of the cage or holder D, designed to be rotated therein, are the transverse supports C, which are provided with open bearings D for the reception of the journal portions E of the shaft F of said cage. The shaft is provided with end extensions G beyond the supports C, and with a toothed wheel H, which is keyed thereon. The boiler is provided with a short power-shaft I, having a pinion $a$, designed to engage the toothed wheel H of the cage when the latter is in position in said boiler. This shaft and pinion are placed at one side of the boiler, or so as not to interfere when the cage is being lifted from its bearings out of the boiler.

The cage may be strongly constructed with slatted ends having stout end plates to secure it to its shaft, a strong galvanized-wire screen forming its cylindrical body portion. In its side an opening is provided to receive a head or cover $b$. The shaft I is provided with fast and loose pulleys and may be turned by a band from a line-shaft. A waste opening or pipe at the bottom of the boiler should be provided in order that the water may be drawn off when desired.

At any convenient distance from the boiler are located the series of drying-frames or supports M, each of which is provided with open bearings $f$ for the journal portions of the cage-shaft, and with a pinion $c$, similar to the pinion $a$ of the boiler, said pinion being carried upon a shaft $d$, provided with pulleys and adapted to be rotated by belting to a line-shaft. Overhead and extending from above said drying-frames to a position above the boiler is an elevated track N, upon which runs a carrier P, which is about as long as the case. The carrier or traveler P is provided at each end with a fall and tackle T, having at its lower end a hook adapted to engage an end extension G of the shaft of the rotary cage. Differential or check blocks are preferably used in these falls in order that the cage may be held at any height automatically. Instead of a track a crane or other carrier device may be used.

A single boiler will serve for a number of cages and drying-frames, the boiling being accomplished in a short time compared with the period required for drying out the grain.

The grain deposited in a cage is rotated in the boiler until sufficiently cooked and relieved of its outer silicious coating and extraneous matter, when it is raised in its cage out of said boiler and transferred to one of the drying-frames, whereby the cage is rotated until the grain therein is sufficiently dried out for the action of the reducing-machine. When one cage of grain is lifted from the boiler and transferred to its drying-frame, another cage can be then placed in the boiler with its charge of grain in turn to be cooked. The boiler and cages can thus be kept constantly in use, and large quantities of the grain prepared.

Having described this invention, what I claim, and desire to secure by Letters Patent, is—

1. Apparatus for cooking and drying grain, consisting of a boiler, its rotating mechanism, a number of holding cages or tumblers adapted to be rotated in said boiler, a series of rotating drying frames adapted to receive said cages and rotate the same, and a traveling hoist and carrier to remove said cages from the boiler to the drying frames, substantially as specified.

2. The combination with hoisting and carrying devices, of a boiler having open journal-bearings and a removable holding cage or tumbler, its shaft and toothed wheel adapted to be readily engaged with or disengaged from said pinion, substantially as specified.

3. The combination with hoisting and carrying devices, of a boiler and drying-frames, having similar open bearings and pinions and the detachable rotary cages, their shafts and toothed wheels, substantially as specified.

In testimony whereof I affix my signature in the presence of two witnesses.

HENRY D. PERKY.

Witnesses:
S. M. STANLEY,
HARRY C. JAMES.